(12) United States Patent
Faucher et al.

(10) Patent No.: US 8,685,612 B2
(45) Date of Patent: Apr. 1, 2014

(54) CONTINUOUS EMULSIFICATION-AGGREGATION PROCESS FOR THE PRODUCTION OF PARTICLES

(75) Inventors: Santiago Faucher, Ontario (CA); Kimberly D. Nosella, Ontario (CA); Lai Chi So, Ontario (CA)

(73) Assignee: Xerox Corporation, Norwalk, CT (US)

( * ) Notice: Subject to any disclaimer, the term of this patent is extended or adjusted under 35 U.S.C. 154(b) by 196 days.

(21) Appl. No.: 13/008,278

(22) Filed: Jan. 18, 2011

(65) Prior Publication Data

US 2012/0183898 A1 Jul. 19, 2012

(51) Int. Cl.
*G03G 9/08* (2006.01)

(52) U.S. Cl.
USPC ............ 430/137.1; 430/137.21; 430/110.3; 430/111.4; 422/606

(58) Field of Classification Search
USPC ............ 430/137.1–137.21, 110.3, 111.4; 422/600–606
See application file for complete search history.

(56) References Cited

U.S. PATENT DOCUMENTS

| | | | |
|---|---|---|---|
| 5,264,315 A * | 11/1993 | Tan et al. ............... | 430/137.12 |
| 7,344,813 B2 | 3/2008 | Sweeney et al. | |
| 7,390,606 B2 | 6/2008 | Patel et al. | |
| 7,560,505 B2 | 7/2009 | Agur et al. | |
| 2002/0076637 A1 | 6/2002 | Iwa et al. | |
| 2006/0183047 A1 * | 8/2006 | Ikami et al. ............ | 430/110.3 |
| 2006/0222989 A1 | 10/2006 | Vanbesien et al. | |
| 2006/0269859 A1 | 11/2006 | Skorokhod et al. | |
| 2007/0020553 A1 * | 1/2007 | Marcello et al. ......... | 430/137.14 |
| 2008/0182191 A1 | 7/2008 | Moffat et al. | |
| 2009/0264585 A1 | 10/2009 | Avramidis et al. | |
| 2010/0055600 A1 * | 3/2010 | Norikane et al. ......... | 430/111.4 |
| 2011/0097664 A1 * | 4/2011 | Nosella et al. ........... | 430/137.14 |
| 2011/0104609 A1 * | 5/2011 | Qiu et al. ............... | 430/137.14 |

* cited by examiner

*Primary Examiner* — Mark F Huff
*Assistant Examiner* — Rashid Alam
(74) *Attorney, Agent, or Firm* — MDIP LLC

(57) ABSTRACT

A continuous emulsion aggregation process for the production of particles is presented including a plurality of continuous stirred-tank reactors (CSTR). The plurality of continuous stirred-tank reactors includes a first reactor and a second reactor for facilitating an aggregation process; a third reactor for facilitating a shell addition process; a fourth reactor for facilitating a freeze process; a fifth reactor for facilitating a chelating process; a sixth reactor for facilitating a ramp-up process; and a seventh reactor for facilitating a coalescence process. The reactors are sequentially assembled in a series configuration, each of the reactors cooperating with an overhead stirrer. In other embodiments, a CSTR system of the present disclosure possesses five reactors sequentially assembled in a series configuration to form toner particles.

18 Claims, 9 Drawing Sheets

CONTINUOUS EMULSIFICATION-AGGREGATION PROCESS FOR THE PRODUCTION OF PARTICLES

BACKGROUND

The present disclosure relates to emulsion aggregation processes. More specifically, the present disclosure relates to production of emulsion aggregation toner particles via a series of continuous stirred tank reactors (CSTR).

Processes for forming toner compositions for use with electrophotographic print or copy devices have been previously disclosed. For example, methods of preparing an emulsion aggregation (EA) type toner are known and toners may be formed by aggregating a colorant with a latex polymer formed by batch or semi-continuous emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 7,785,763, 7,749,673, 7,695,884, 7,615,328, 7,429,443, 7,329,476, 6,830,860, 6,803,166, 6,764,802, the disclosures of each of which are hereby incorporated by reference in their entirety.

As noted above, latex polymers utilized in the formation of EA type toners may be formed by batch or semi-continuous emulsion polymerization. Batch processes for producing resins may be subjected to bulk polycondensation polymerization in a batch reactor at an elevated temperature. The time required for the polycondensation reaction is long, due to heat transfer of the bulk material, high viscosity, and limitations on mass transfer. The resulting resin is then cooled, crushed, and milled prior to being dissolved into a solvent. The dissolved resin is then subjected to a phase inversion process where the polyester resin is dispersed in an aqueous phase to prepare polyester latexes. The solvent is then removed from the aqueous phase by a distillation method.

The use of solvents in this process may cause environmental concerns. For example, if the solvent level is not low enough (<50 ppm), extensive waste water treatment and solvent remediation may be required.

In addition, where a batch process is utilized for aggregation and/or coalescence process, because the individual batch process involves the handling of bulk amounts of material, each process may take many hours to complete before moving to the next process in the formation of the toner particles, that is, aggregation and/or coalescence. In addition, batch-to-batch consistency is frequently difficult to achieve because of variations that may arise from one batch to another.

Moreover, methods of improving the space time yield of the EA process have been previously examined, but without yielding particles of interest. For example, continuous tubular reactors have been studied, but some issues remain with respect to their use at producing toner particles.

Therefore, other reactors for the preparation of toner particles in a continuous process are desirable. Such reactors should be more efficient, take less time, result in a consistent toner particle product, and be environmentally friendly.

SUMMARY

The present disclosure provides for a continuous emulsion aggregation process system. The system includes feed tanks for raw materials; a first reactor and a second reactor for facilitating an aggregation process; optionally a third reactor for facilitating a shell material addition process; a fourth reactor for facilitating a freeze process; a fifth reactor for facilitating a chelating process; a sixth reactor for facilitating a temperature ramp-up process; and a seventh reactor for facilitating a coalescence process. The first, second, third, fourth, fifth, sixth, and seventh reactors are sequentially assembled in a series configuration, each of the reactors operating with a mechanical agitator.

In addition, in the example embodiments, the reactors are continuously stirred tank reactors. For example, a space time yield of the continuous emulsion aggregation process is about 160 g of toner particles/L/hr.

Moreover, each reactor handles a volume between about 250 mL and about 2000 L. The reactors are heated either through external fluid jackets or electrical heaters. Alternatively, the heating from stage to stage can be done via shell and tube heat exchangers. Shell latex is continuously or periodically pumped into the third reactor. A base or a basic buffer is continuously or periodically pumped into the fourth reactor. A chelating agent is continuously or periodically pumped into the fifth reactor. A buffer is continuously or periodically pumped into the seventh reactor.

In yet another example embodiment, the materials are mixed at a first rate in the first, second, and third reactors and the materials are mixed at a second rate in the fourth, fifth, sixth, and seventh reactors, where the first rate is greater than the second rate. The reactor temperatures are incrementally higher as the materials channel through the series configuration of the reactors and a residence time of each reactor is between 5 min and 10 min.

The present disclosure further provides a continuous emulsion aggregation system. The system includes feed tanks raw materials; a first reactor for facilitating an aggregation process; a second reactor for facilitating a shell addition process; a third reactor for facilitating a freeze process and a chelating process; a fourth reactor for facilitating a ramp-up process; and a fifth reactor for facilitating a coalescence process. The first, second, third, fourth, and fifth reactors are sequentially assembled in a series configuration, each of the reactors cooperating with an overhead stirrer.

In further embodiments, a method of the present disclosure may include feeding materials into the system at a controlled rate; providing a plurality of reactors sequentially assembled in a series configuration; facilitating an aggregation process via a first reactor and a second reactor; facilitating a shell addition process via a third reactor; facilitating a freeze process via a fourth reactor; facilitating a chelating process via a fifth reactor; facilitating a ramp-up process via a sixth reactor; and facilitating a coalescence process via a seventh reactor.

In further embodiments, a method of the present disclosure may include feeding materials into the system at a controlled rate; providing a plurality of reactors sequentially assembled in a series configuration; facilitating an aggregation process via a first reactor; facilitating a shell addition process via a second reactor; facilitating a freeze process and a chelating process via a third reactor; facilitating a ramp-up process via a fourth reactor; and facilitating a coalescence process via a fifth reactor.

BRIEF DESCRIPTION OF THE DRAWINGS

Various embodiments of the present disclosure will be described herein below with reference to the figures wherein.

DETAILED DESCRIPTION OF EMBODIMENTS

Figure 1:
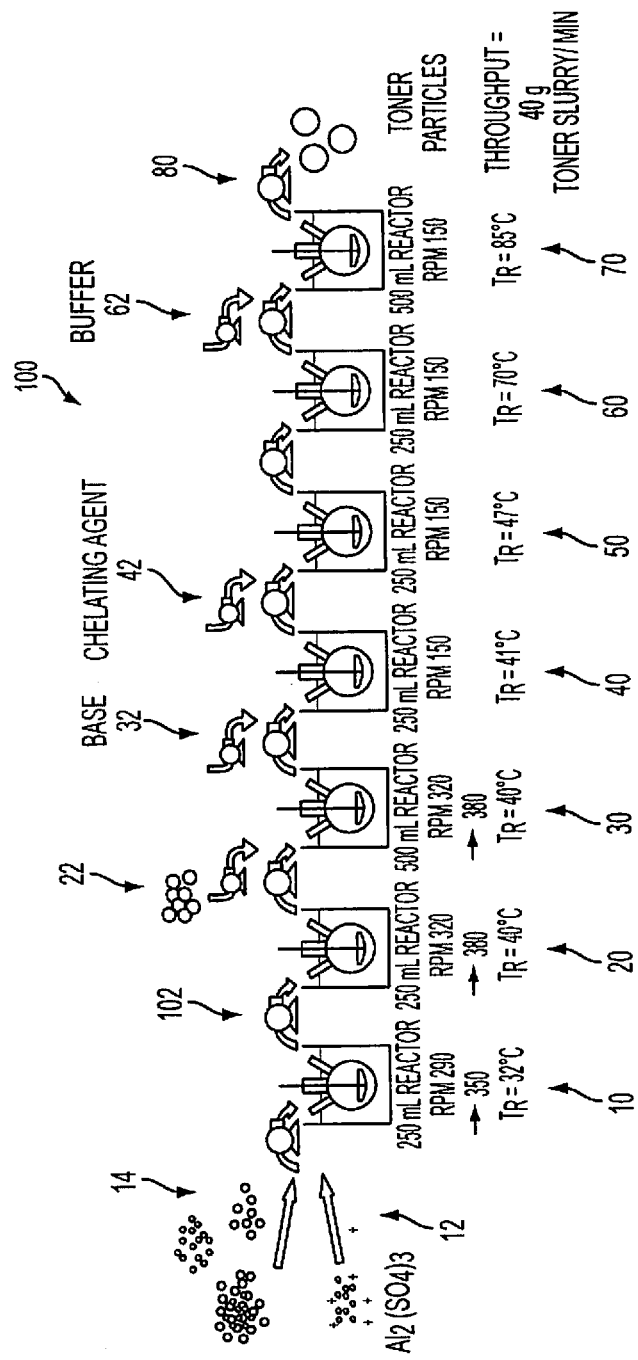
FIG. 1 schematically shows a continuous emulsion aggregation (EA) system having seven reactors, in accordance with a first embodiment of the present disclosure.

The present disclosure provides for a process, formulation, and mechanical equipment setup for the continuous production of emulsion aggregation (EA) toner particles that has a space time yield of from about 0.1 g/L/hr to about 500 g/L/hr, in embodiments from about 0.2 g/L/hr to about 400 g/L/hr, in embodiments about 160 g/L/hr. As used herein, a space time yield means, in embodiments, represents the mass of a product P formed, per total reactor volume used, per total residence time in the total reactor volume. The following formula is applied to determine the space time yield, $\sigma_p = m_p/Vt$; where $m_p$ is the mass of the dry toner (product), V is the total reactor volume and t is total reactor residence time. This space time yield is approximately an 1800% improvement over the current EA process, which has a space time yield of about 9 g/L/hr. As a result, the next EA plant designed according to the example embodiments described herein may have reactors that are substantially smaller than those currently used commercially. Furthermore, the current proposed process, due to its more compact scale, would require a much lower workforce to operate it, thus reducing the overhead costs associated with the production of EA toner particles. This ultimately leads to reduced toner costs.

The processes of the present disclosure rely on a series of continuous stirred-tank reactors (CSTR) to undertake the various steps of an EA process. Each reactor is set to operate under a specific set of conditions to attain the desired effect on the particle size, particle size distribution, circularity, and other such factors pertinent to achieving toner particles. In addition, recent advances in high throughput EA have been combined with this setup to increase the speed of the EA process such as, for example, the use of caustic buffers in lieu of bases.

In general, in accordance with the present disclosure, a CSTR system is provided, which includes about 250 mL to about 500 mL round bottom flasks, where each is equipped with overhead stirrers, impellers, and hotplate bath temperature controls. These separate flasks, which function as separate reactors, are able to continuously make from about 10 grams/minute to about 200 grams/minute of coalesced final toner slurry, with residence times in each reactor of about 20 minutes down to about 1 minute, respectively. Below are exemplary embodiments that have achieved all the EA toner steps necessary to achieve the final toner targets. Both examples produce about 40 grams/minute of toner slurry and have about a 5 minute or about a 10 minute residence time per reactor. The sizes of the reactors in the embodiments were selected to reduce the amount of raw materials needed during the experiments while being sufficiently large to permit sampling and demonstration of the present disclosure. Larger reactors may be used so long as the fluid mixing profile and temperature ranges required can be maintained close to those desired for particle growth and particle size distribution. That is, the process is not limited in scale so long as mixing and temperature requirements are met. One skilled in the art may contemplate modifying all the above-mentioned parameters to achieve the results of the exemplary embodiments described below.

Continuous Emulsion Aggregation Process with CSTRs

First Embodiment

In a first embodiment, seven round bottom flask reactors, each equipped with overhead stirrers with half-moon impellers, are connected in series to form a CSTR system, as shown in FIG. 1. Referring to FIG. 1, a CSTR system 100 is presented having a first reactor 10, a second reactor 20, a third reactor 30, a fourth reactor 40, a fifth reactor 50, a sixth reactor 60, and a seventh reactor 70. A homogenization process 12 takes place for the materials 14 that are fed into the first reactor 10. The materials 14 may be at least core latexes with surfactants, pigments, wax, colorants, etc., as described herein.

The first reactor 10 and the second reactor 20 perform an aggregation process. The third reactor 30 performs a shell addition process. The fourth reactor 40 performs a freeze process. The fifth reactor 50 performs a chelating process. The sixth reactor 60 performs a ramp-up process, whereas the seventh reactor 70 performs a coalescence process. Multi-channel peristaltic pumps 102 are used between each of the reactors 10-70 to channel the materials 14 and slurry through the train 100.

A shell latex 22 is pumped into the third reactor 30 continuously or periodically, a base 32, is pumped into the fourth reactor 40 continuously or periodically, a chelating agent 42, is pumped into the fifth reactor 50 continuously or periodically, and a buffer 62, is pumped into the seventh reactor 70, continuously or periodically. As a result of this process, toner particles 80 are discharged from the seventh reactor 70.

In particular, each of the reactors 10-70 is immersed in a temperature control bath to control the temperature of the toner slurry inside the reactors 10-70. Double walled reactors or resistance heating may also be used for heating and cooling to achieve the desired temperature. Slurry within the reactors 10-70 is pumped into and out of the reactors 10-70 using multi-channel peristaltic pumps. The shell latex 22 is pumped into the third reactor 30 using a peristaltic pump, whereas the base 32, the chelating agent 42, and buffer 62 are pumped into their respective reactors as necessary to achieve the various EA process steps.

The first reactor 10 and the second reactor 20 may be charged with 180 grams of the homogenized slurry. The third reactor 30 may be charged with 240 grams of homogenized slurry. The fourth reactor 40 and the fifth reactor 50 begin empty and fill once the continuous feed fills them. The sixth reactor 60 may be charged with 180 grams of DIW and the seventh reactor 70 may be charged with 240 grams of DIW. Additionally, reactors that are pre-filled with material, whether homogenized slurry or DIW can also be filled with flocculent-free slurry with or without pH adjustment. Both the sixth reactor 60 and the seventh reactor 70 are heated by external baths to achieve desired reactor temperatures. The remaining homogenized slurry is continuously mixed at room temperature, with an overhead stirrer and a three-blade impeller. This slurry is used as the continuous feed slurry.

The first reactor 10, the second reactor 20, and the third reactor 30 are heated to a desired reactor temperature. When stable particle sizes are achieved in each of these reactors 10, 20, and 30, the homogenized slurry is continuously pumped into the CSTR system 100.

Figure 2A:
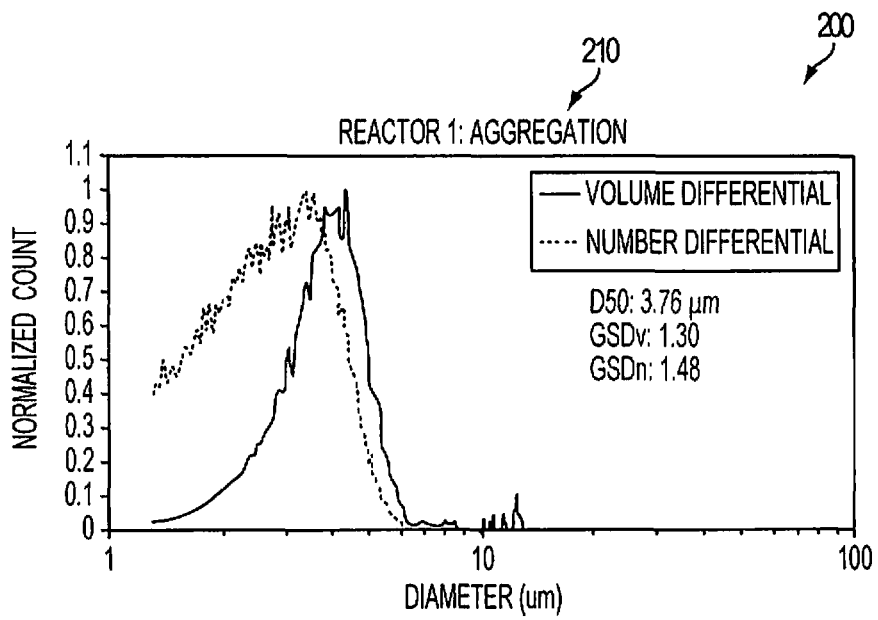
FIGS. 2A-2G schematically show steady state particle size distributions obtained at a plurality of EA steps of FIG. 1
Figure 2B:
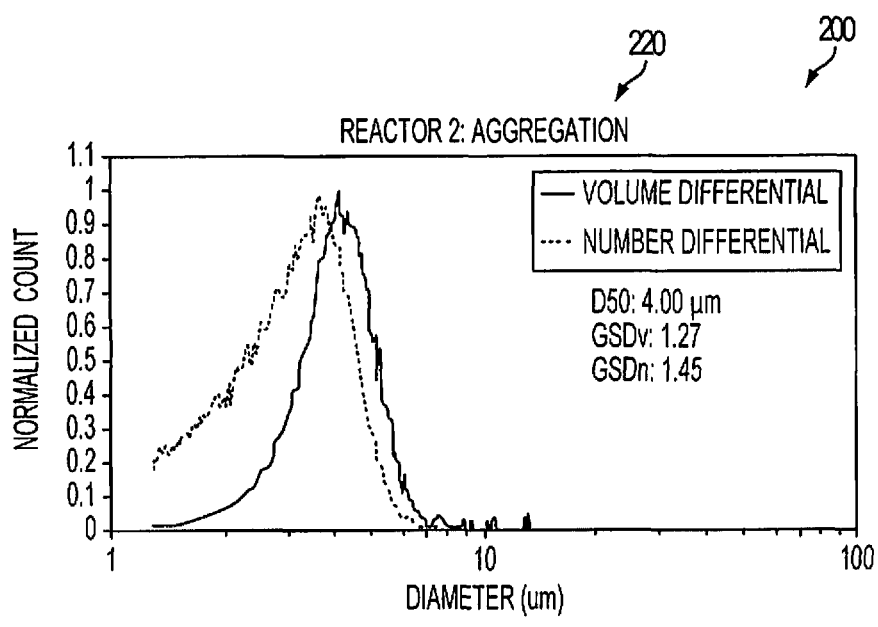
Figure 2C:
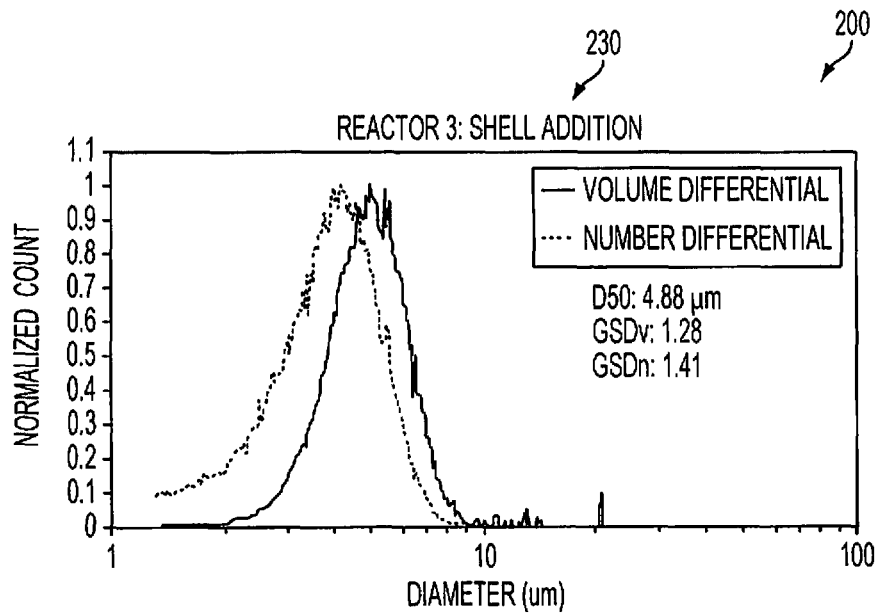

Particle size traces obtained after the aggregation step (in the first and second reactors 10, 20) reach steady state after about 5 minutes and 10 minutes, respectively, as shown in FIG. 2(a) (210) and FIG. 2(b) (220). Particle size traces obtained after shell addition (in the third reactor 30) reach steady state after about 20 minutes, as shown in FIG. 2(c) (230).

Figure 2D:
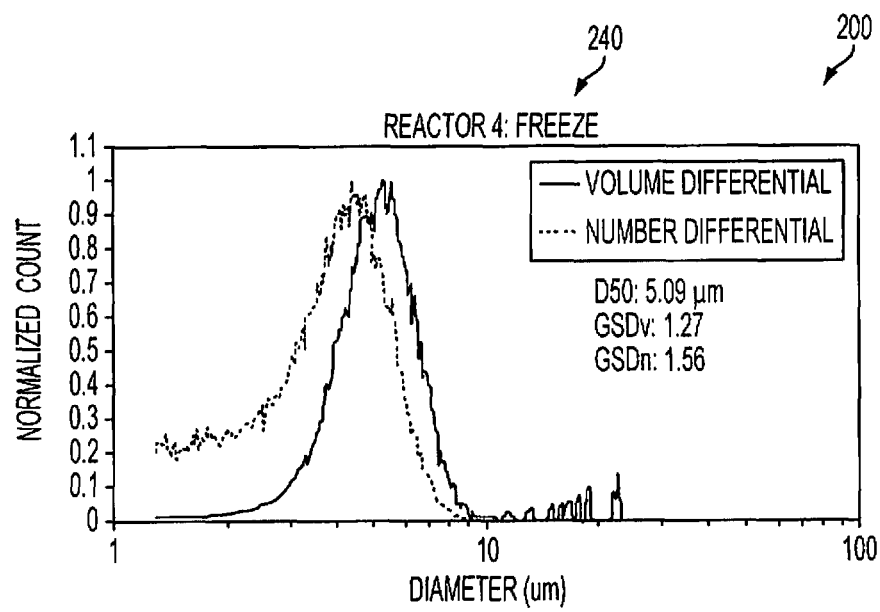
Figure 2E:
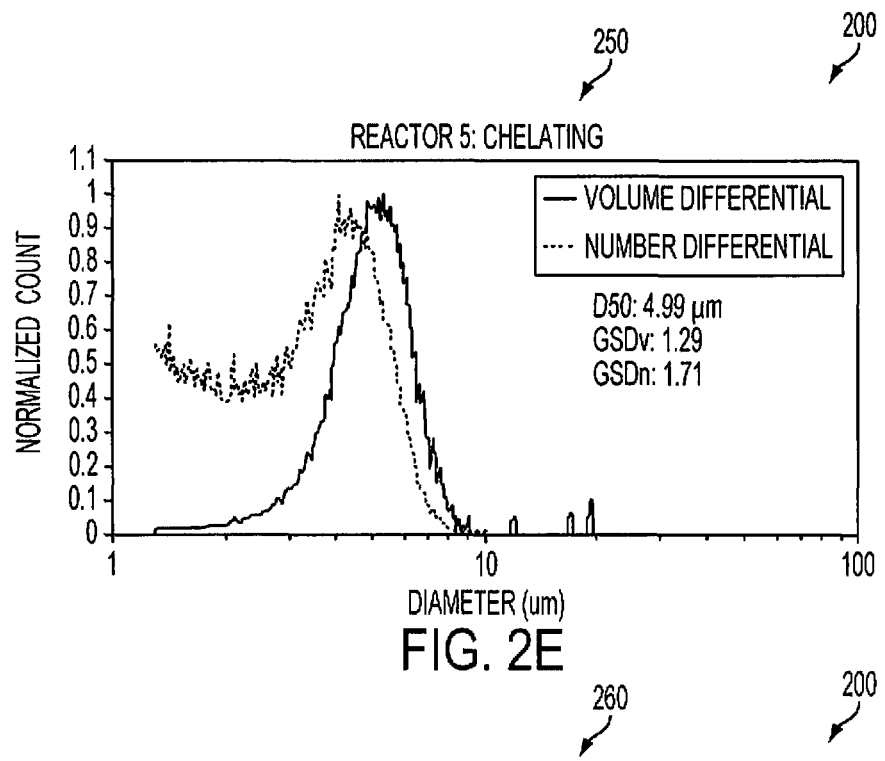

Once the fourth reactor 40 has filled, base 32 is continuously pumped into the fourth reactor 40. Once the fifth reactor 50 has filled, the chelating agent 42 is continuously pumped into the fifth reactor 50. As shown in FIG. 2(d) (240) and FIG. 2(e) (250), the particles may be frozen in about 10 minutes.

Figure 2F:
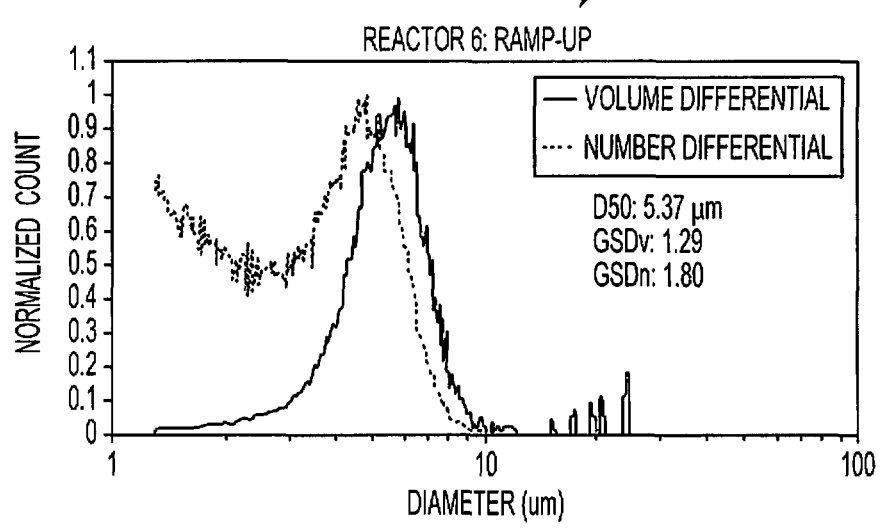

The process proceeds to the sixth reactor 60, where the slurry in the reactor 60 undergoes an instant temperature ramp because the reactor temperature is maintained at about 70° C. The particle size distribution from the sixth reactor 60 is shown in FIG. 2(f) (260). Once the seventh reactor 70 has filled, buffer 62 is continuously pumped into the seventh reactor 70. In the seventh reactor 70, the particles are then coalesced at a reactor temperature of about 85° C.

Figure 2G:
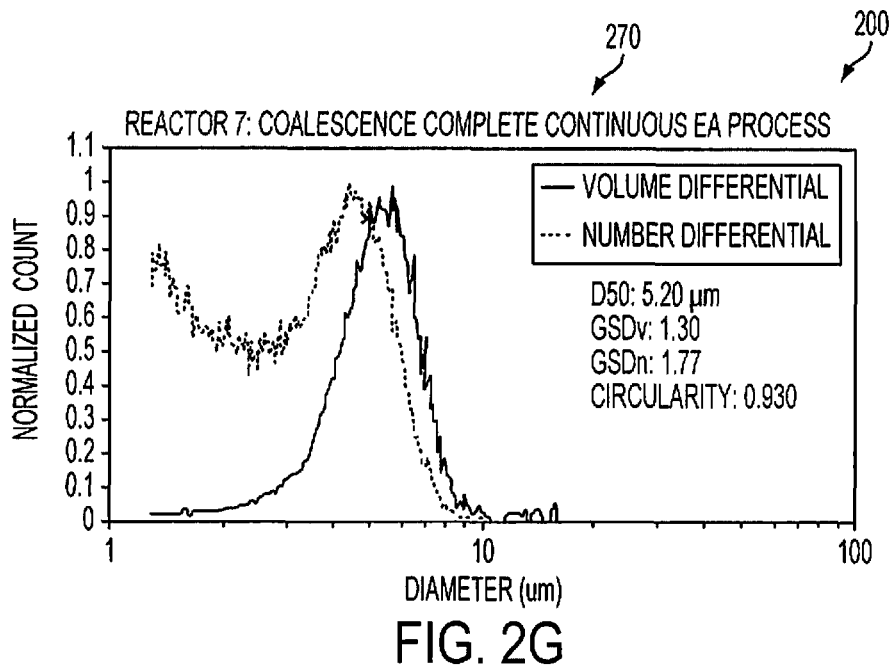
Figure 2H:
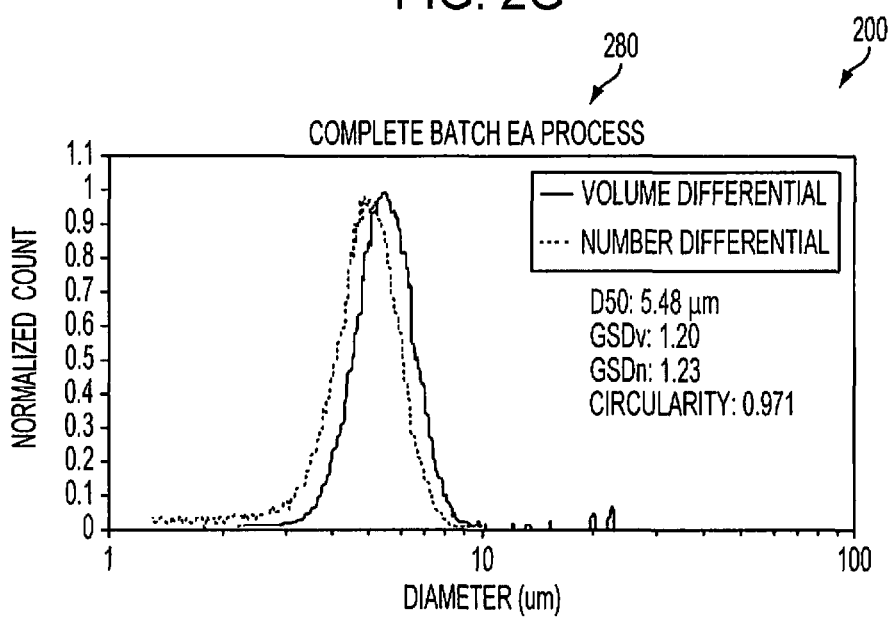
FIG. 2H is the final particle size distribution for the comparative batch version of EA, in accordance with the first embodiment of the present disclosure.

Toner product obtained from the seventh reactor 70 is quenched by stirring the product in a beaker filled with DIW ice cubes. After approximately 45 minutes, particle size distribution obtained at the end of the CSTR system 100 reaches steady state, as shown in FIG. 2(g) (270). This represents time zero for the process. This is the time at which the process has transitioned to its continuous steady state performance. As shown in FIG. 2(g) (270) and FIG. 2(h) (280), the steady state particle size distribution and circularity after the complete EA process is comparable to that achieved in a batch process.

Toner particle size distributions are monitored in all seven reactors 10-70. Particle size distributions reach steady state in reactors 10-70 in about 5 minutes, 10 minutes, 20 minutes, 25 minutes, 30 minutes, 35 minutes, and 45 minutes, respectively, after slurry begins pumping into the CSTR system 100. Steady state particle size distributions obtained at the end of the process are shown in FIGS. 2A-2G (200-280). The pH of slurry is monitored in the fourth, fifth, sixth, and seventh reactors (40-70). Thus, with this process, toner slurry is continuously generated at about 40 mL/minute.

Second Embodiment

Figure 3:
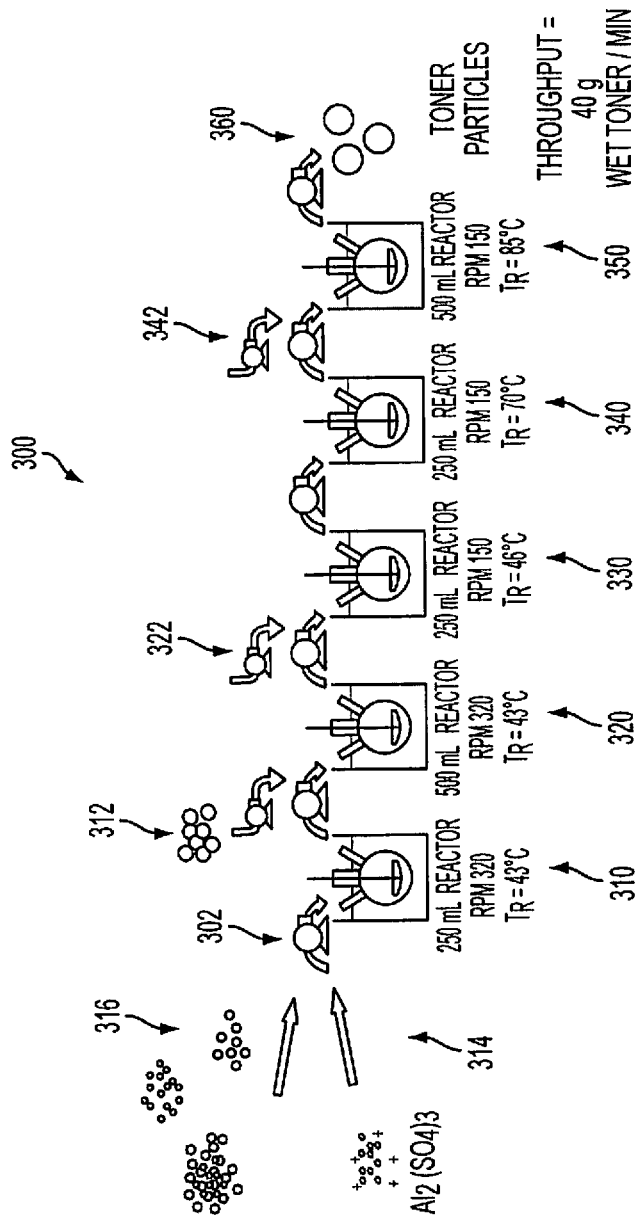
FIG. 3 schematically shows a continuous emulsion aggregation (EA) system having five reactors, in accordance with a second embodiment of the present disclosure.

In a second embodiment of the present disclosure, as shown in FIG. 3, five round bottom flask reactors, each equipped with overhead stirrers with half-moon impellers, are connected in series to form a CSTR system 300. Referring to FIG. 3, a CSTR system 300 is presented having a first reactor 310, a second reactor 320, a third reactor 330, a fourth reactor 340, and a fifth reactor 350. A homogenization process 314 takes place for the materials 316 that are fed into the first reactor 310. The materials 316 may be at least core latexes with surfactants, pigments, wax, colorants, etc., as described herein.

The first reactor 310 performs an aggregation process. The second reactor 320 performs a shell addition process. The third reactor 330 performs a freeze process and a chelating process. The fourth reactor 340 performs a ramp-up process, whereas the fifth reactor 350 performs a coalescence process. A multi-channel peristaltic pump 302 is used between each of the reactors 310-350 to pump the materials 316 and slurry through the train 300.

Each reactor 310-350 is heated either through external fluid jackets or electrical heaters. Alternatively the heating from stage to stage can be done via shell and tube heat exchangers. Slurry within the reactors 310-350 is pumped into and out of the reactors 310-350 using multi-channel peristaltic pumps 302. The shell latex 312 is pumped into the second reactor 320 using a peristaltic pump, whereas the chelating agent 322 and buffer 342, are pumped into their respective reactors using positive displacement pumps as necessary to achieve the various EA process steps.

The process begins by the homogenization 314 of a slurry according to the same formulation and process as in the first embodiment described above. The first reactor 310 may be charged with 180 grams of homogenized slurry. The second reactor 320 may be charged with 240 grams of homogenized slurry. The third reactor 330 begins empty and fills once the continuous feed fills it. The fourth reactor 340 may be charged with 180 grams of DIW and the fifth reactor 350 may be charged with 240 grams of DIW.

Figure 4A:
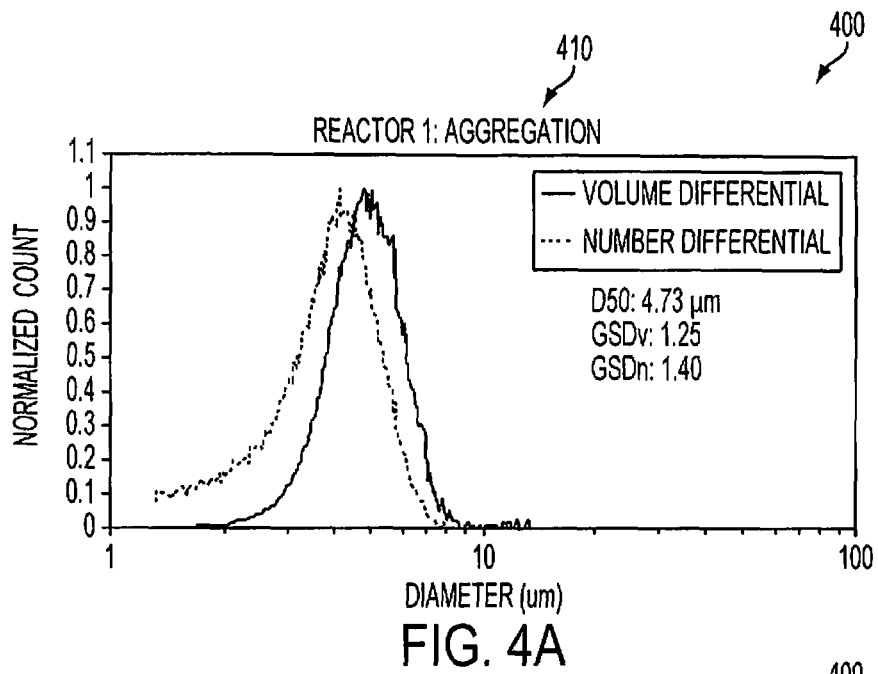
FIGS. 4A-4E schematically show steady state particle size distributions obtained at a plurality of EA steps of FIG. 3
Figure 4B:
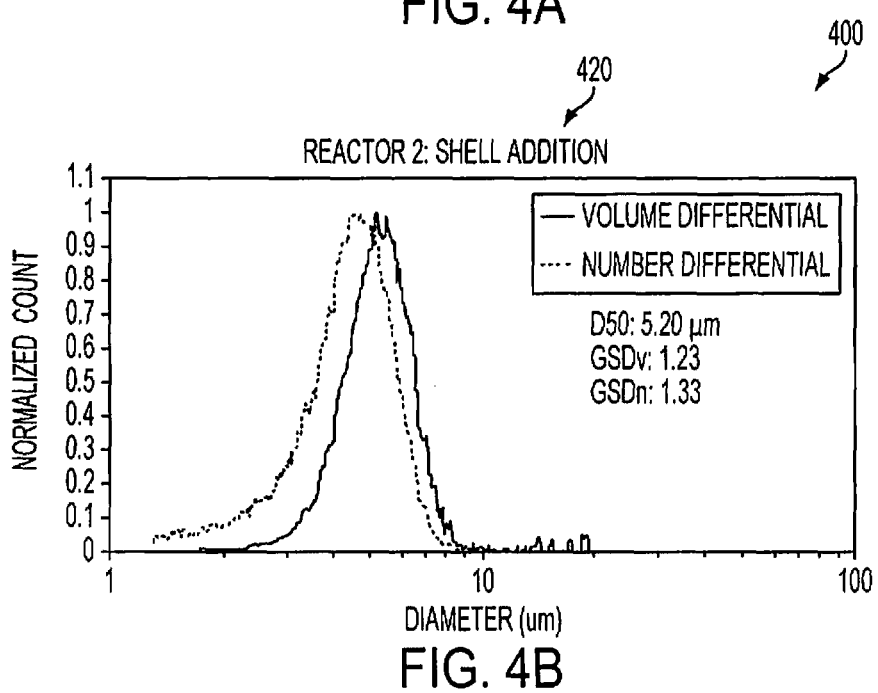

The first and second reactors 310, 320 are both heated to desired reactor temperatures. The second reactor 320 is continuously pumped with shell latex 312. When stable particle sizes are achieved in the first and second reactors 310, 320, the homogenized slurry in at least one reactor is continuously pumped into the CSTR system 300. Particle size distributions obtained after the aggregation step (in the first reactor 310), reaches steady state after about 5 minutes, as shown in FIG. 4(a) (410). Particle size distributions obtained after shell addition (in the second reactor 320), reaches steady state after about 15 minutes, as shown in FIG. 4(b) (420).

Figure 4C:
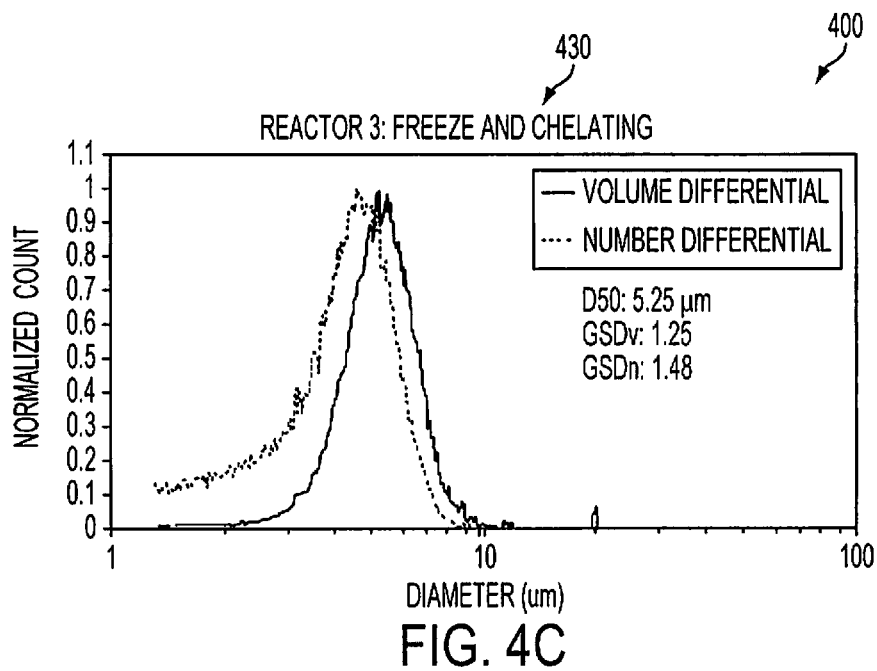

Following the shell addition step, the particle aggregation is followed by a freeze and chelation step in the third reactor 330. The third reactor 330 is heated to a desired reactor temperature. Once the third reactor 330 is filled, chelating agent 322 is continuously pumped into the third reactor 330 from. As may be seen in FIG. 4(c) (430), the particles may be frozen in about 5 minutes.

Figure 4D:
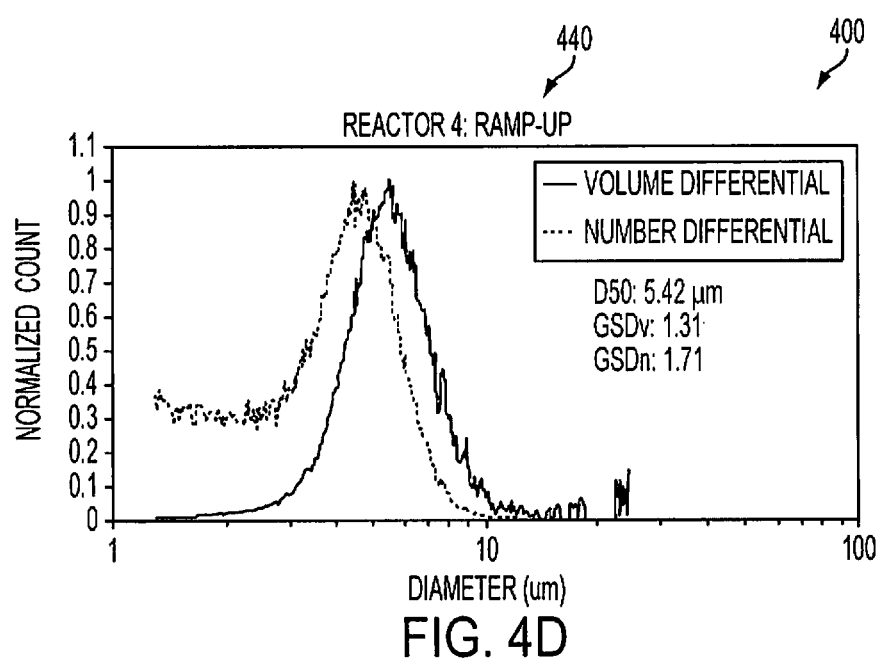

The process then proceeds to the fourth reactor 340, where the slurry is instantly heated by external baths. FIG. 4(d) (440) shows the steady state particle size distribution obtained from the fourth reactor 340.

Once the fifth reactor 350 is filled, buffer 342 is continuously pumped into the fifth reactor 350. In the fifth reactor 350, the particles are then coalesced at a reactor temperature of about 85° C., while maintaining a pH of less than about 6 with the addition of buffer 342. Toner product is obtained from the exit pumping line in the fifth reactor 350 and is quenched by stirring the product in a beaker filled with DIW ice cubes.

Figure 4E:
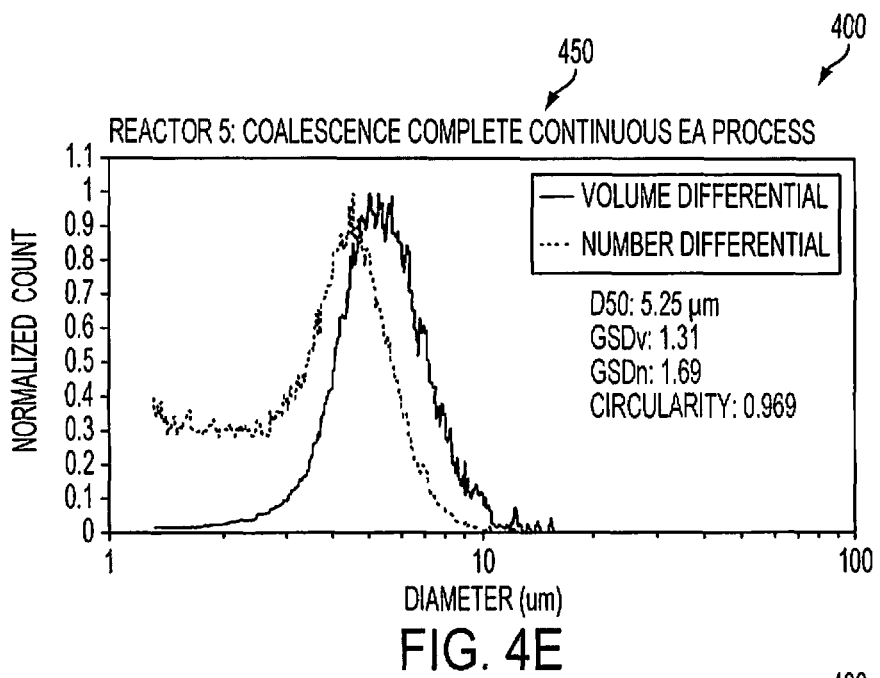

As a result, after about 35 minutes, particle size traces obtained at the end of the CSTR system 300 reach steady state, as shown in FIG. 4(e) (450). Similar to the first embodiment described above, this represents the time at which the process has transitioned to its continuous steady state performance.

Figure 4F:
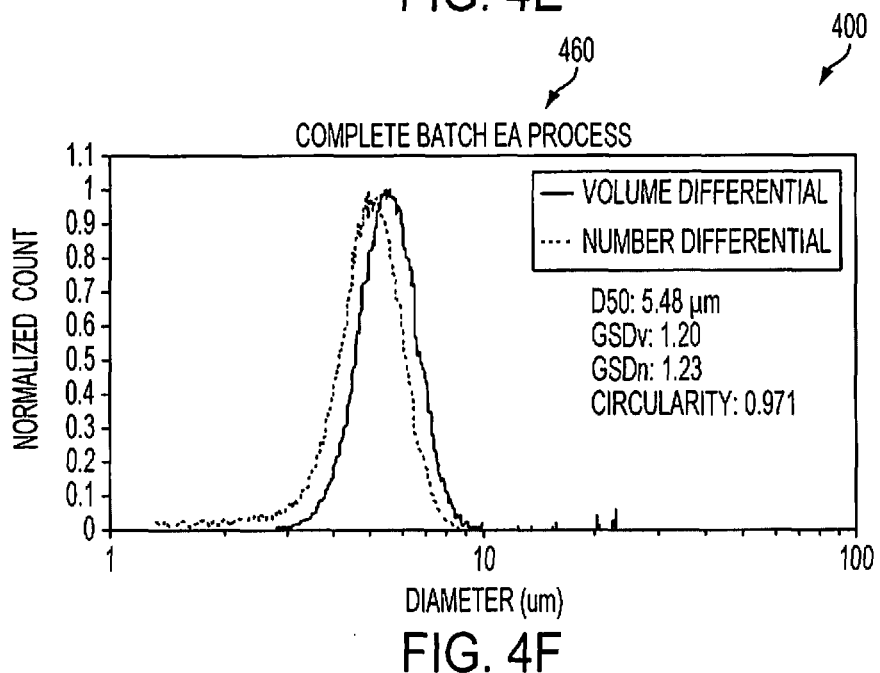
FIG. 4F is the final particle size distribution for the comparative batch version of EA, in accordance with the second embodiment of the present disclosure.

As shown in FIG. 4(e) (450) and FIG. 4(f) (460), the steady state particle size distribution and circularity after the complete EA process is comparable to that achieved in a batch process. Thus, once again, coalesced toner particles are generated with this continuous process at about 40 mL/minute.

Toner particle size distributions are monitored in each reactor 310-350. Particle size distributions achieve steady state in reactors 310-350 in about 5 minutes, 15 minutes, 20 minutes, 25 minutes, and 35 minutes after slurry begins pumping into the CSTR system 300. Steady state particle size distributions obtained at the end of the process are shown in FIGS. 4A-4E (410-460). The mixing speeds in the first and second reactors 310, 320 are not increased after slurry begins pumping into the CSTR system 300, but do not show significant adverse impact on the incorporation of feed slurry into the toner particles 360, as shown in FIGS. 4A-4E (410-460).

Slurry pH is monitored in the third, fourth, and fifth reactors 330-350. Circularity of the toner product is monitored, as shown in FIG. 4(*e*) (450). At about 90 minutes after slurry begins pumping into the CSTR system 300, the process is stopped due to the complete consumption of the feed slurry, shell latex 312, and the chelating agent 322.

Thus, in the second embodiment, the aggregation step is achieved in one reactor in about 5 minutes and the freeze and chelation steps are combined into one reactor without negatively influencing the particle size distribution. The second embodiment demonstrates that the continuous setup may be simplified from a 7-CSTR system 100 (see FIG. 1) to a 5-CSTR system 300 (see FIG. 3).

Differences

The following are differences between the first and second embodiments:

Aggregation step: The first embodiment used two reactors (10, 20) for this step, while the second embodiment used only one reactor (310) for this step.

Freeze and chelating steps: Freeze and chelating steps were achieved in two separate reactors (40, 50) in the first embodiment, whereas the two steps were achieved in one reactor (330) in the second embodiment.

Increase in mixing speeds for aggregation and shell addition reactors after pumping of feed slurry into the CSTR system. In the first embodiment, the mixing speeds for reactors 10-30 were increased after pumping of feed slurry into the CSTR system 100. The mixing speeds for reactors 310, 320 were not increased in the second embodiment after pumping of feed slurry into the CSTR system 300.

Coalescence step: In the first embodiment, a pH≤7 was targeted, whereas in the second embodiment, a pH≤6 was targeted.

Several advantages were found using, the process, equipment, and formulation disclosed herein:

(1) A space time yield of about 160 grams toner particles/L/h, which is an 1800% increase over the current or conventional space time yield of 9 g/L/h.

(2) Accelerates the EA process so that material residence times are reduced from about 16.7 hours to about less than 1 hour.

(3) Produces EA toner particles continuously.

(4) Reduces the equipment size required to achieve a given production rate when contrasted to the current batch process.

(5) Greatly reduces the overhead cost of producing EA toner particles.

(6) Leads to a large reduction in toner production cost.

Of course, one skilled in the art may contemplate using a plurality of reactors in a series configuration, where the above steps are interchanged, where the size of the reactors is changed, where the temperature of each reactor is changed, and/or where the residence time is changed to achieve the results of the embodiments described above.

While the above description has identified specific components of a toner and materials utilized to form such toners, e.g., specific resins, colorants, waxes, surfactants, bases, buffers, etc., it is understood that any component and/or material suitable for use in forming toner particles may be utilized with a system of the present disclosure as described herein. Exemplary components and materials that may be utilized to form toner particles with a system of the present disclosure are set forth below.

Resins

Any resin may be utilized in forming a latex emulsion of the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), polyethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 50 percent by weight of the toner components, in embodiments from about 5 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic dials selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

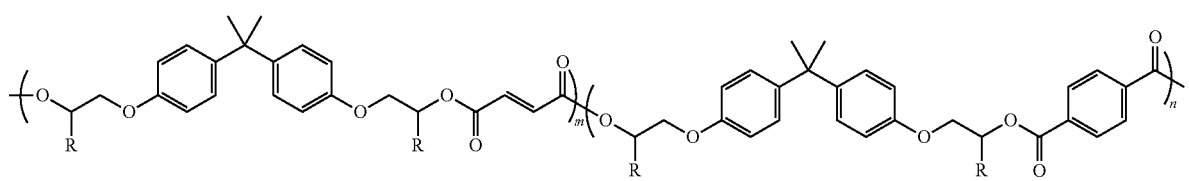

(I)

wherein R may be hydrogen or a methyl group, and m and n represent random units of the copolymer and m may be from about 2 to 10, and n may be from about 2 to 10.

An example of a linear copoly(propoxylated bisphenol A co-fumarate)-copoly(propoxylated bisphenol A co-terephthalate) which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C. and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

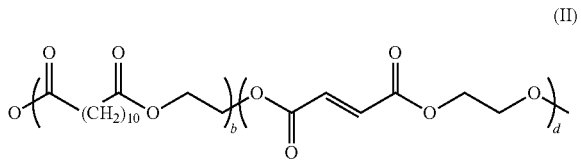

(II)

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

The amorphous resin may be present, for example, in an amount of from about 30 to about 90 percent by weight of the toner components, in embodiments from about 40 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin), Where the resin includes an amorphous resin and a crystalline resin, the weight ratio of the two resins may be from about 99% (amorphous resin): 1% (crystalline resin), to about 1% (amorphous resin): 90% (crystalline resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Surfactants

In embodiments, colorants, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Anionic surfactants which may be utilized include sulfates and sulfonates, sodium dodecylsulfate (SDS), sodium dodecylbenzene sulfonate, sodium dodecyinaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, mixtures thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ may be selected.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof as well as the amounts of each to be used are within the purview of those skilled in the art.

Colorants

As the colorant to be added, various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, or from about 1 to about 15 weight percent of the toner, or from about 3 to about 10 percent by weight of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP608™; Magnox magnetites TMB-100™, or TMB-104™; and the like. As colored pigments, there can be selected cyan, magenta, yellow, red, green, brown, blue or mixtures thereof.

Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Waxes

In addition to the latex and colorant, the toners of the present disclosure also optionally contain a wax, which can be either a single type of wax or a mixture of two or more different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

Suitable waxes include, for example, submicron wax particles in the size range of from about 50 to about 500 nanometers, in embodiments of from about 100 to about 400 nanometers in volume average diameter, suspended in an aqueous phase of water and an ionic surfactant, nonionic surfactant, or mixtures thereof. The ionic surfactant or nonionic surfactant may be present in an amount of from about 0.5 to about 10 percent by weight, and in embodiments of from about 1 to about 5 percent by weight of the wax.

The wax dispersion according to embodiments of the present disclosure includes a wax for example, a natural vegetable wax, natural animal wax, mineral wax and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., Viscol 550-P, a low weight average molecular weight polypropylene available from Sanyo Kasel K.K., and similar materials. In embodiments, commercially available polyethylene waxes possess a molecular weight (Mw) of from about 1,000 to about 1,500, and in embodiments of from about 1,250 to about 1,400, while the commercially available polypropylene waxes have a molecular weight of from about 4,000 to about 5,000, and in embodiments of from about 4,250 to about 4,750.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, Joncryl 74, 89, 130, 537, and 538, all available from Johnson Diversey, Inc, or chlorinated polypropylenes and polyethylenes commercially available from Allied Chemical and Petrolite Corporation and Johnson Diversey, Inc.

The wax may be present in an amount of from about 1 to about 30 percent by weight, and in embodiments from about 2 to about 20 percent by weight of the toner.

Basic Buffer Solutions

In embodiments, the buffer system may include at least two of acids, salts, bases, organic compounds, and combinations thereof in a solution with deionized water as the solvent.

Suitable acids which may be utilized to form the buffer system include, but are not limited to, organic and/or inorganic acids such as acetic acid, citric acid, hydrochloric acid, boric acid, formic acid, oxalic acid, phthalic acid, salicylic acid, combinations thereof, and the like.

Suitable salts or bases which may be utilized to form the buffer system include, but are not limited to, metallic salts of aliphatic acids or aromatic acids and bases, such as sodium hydroxide (NaOH), sodium tetraborate, potassium acetate, zinc acetate, sodium dihydrogen phosphate, disodium hydrogen phosphate, potassium formate, potassium hydroxide, sodium oxalate, sodium phthalate, potassium salicylate, combinations thereof, and the like.

Suitable organic compounds which may be utilized to form the buffer system include, but are not limited to, tris(hydroxymethyl)aminomethane (TRIS), Tricine, Bicine, Glycine, HEPES, Triethanolamine hydrochloride, 3-(N-morpholino)propanesulfonic acid (MOPS), combinations thereof, and the like.

In embodiments, a suitable buffer system may include a combination of acids and organic compounds. For example, a buffer system may include TRIS and hydrochloric acid.

The amount of acid and organic compound utilized in forming the buffer system, as well as deionized water utilized in forming a buffer solution, may vary depending upon the acid used, the organic compound used, and the composition of the toner particles. As noted above, a buffer system may include both an acid and an organic compound. In such a case, the amount of acid in the buffer system may be from about 1% to about 40% by weight of the buffer system, such as from about 2% to about 30% by weight. The amount of organic compound in the buffer system may be from about 10% to about 50% by weight of the buffer system, such as from about 30% to about 40% by weight of the buffer system.

The amount of acid and/or organic compound in the buffer system may be in amounts so that the pH of the buffer system is from about 7 to about 12, such as from about 7 to about 9, from about 8 to about 9, or about 9.

The buffer system may be added to the toner slurry as described above so that the pH of the final toner slurry is from about 6 to about 9, such as from about 7 to about 8.

Chelating Agents

In embodiments a chelating agent may be added to the toner mixture during aggregation of the particles. Such chelating agents and their use in forming toners are described, for example, in U.S. Pat. No. 7,037,633, the disclosure of which is hereby incorporated by reference in its entirety. Examples of suitable chelating agents include, but are not limited to, chelates based on ammonia, diamine, triamine or tetramine. In embodiments, suitable chelating agents include, for example, organic acids such as ethylene diamine tetra acetic acid (EDTA), GLDA (commercially available L-glutamic acid N,N diacetic acid), humic and fulvic acids, peta-acetic and tetra-acetic acids; salts of organic acids including salts of methylglycine diacetic acid (MGDA), and salts of ethylenediamine disuccinic acid (EDDS); esters of organic acids including sodium gluconate, magnesium gluconate, potassium gluconate, potassium and sodium citrate, nitrotriacetate (NTA) salt; substituted pyranones including maltol and ethyl-maltol; water soluble polymers including polyelectrolytes that contain both carboxylic acid (COOH) and hydroxyl (OH) functionalities; and combinations thereof. Examples of specific chelating agents include

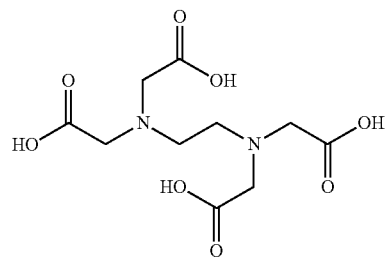
EDTA

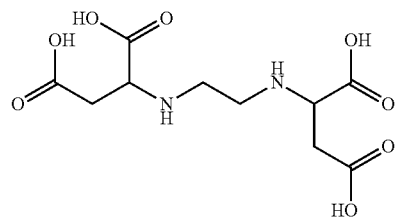
EDDS
and

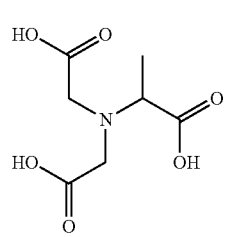
MGDA

In embodiments, EDTA, a salt of methylglycine diacetic acid (MGDA), or a salt of ethylenediamine disuccinic acid (EDDS), may be utilized as a chelating agent.

The amount of sequestering agent added may be from about 0.25 pph to about 4 pph, in embodiments from about 0.5 pph to about 2 pph. The chelating agent complexes or chelates with the coagulant metal ion, such as aluminum, thereby extracting the metal ion from the toner aggregate particles. The resulting complex is removed from the particle to lower the amount of retained aluminum in the toner. The amount of metal ion extracted may be varied with the amount of sequestering agent, thereby providing controlled crosslinking. For example, in embodiments, adding about 0.5 pph of the sequestering agent (such as EDTA) by weight of toner, may extract from about 40 to about 60 percent of the aluminum ions, while the use of about 1 pph of the sequestering agent (such as EDTA) may result in the extraction of from about 95 to about 100 percent of the aluminum.

In embodiments, the toners may be blended at speeds from about 1500 rpm to about 7000 rpm, in embodiments, from about 3000 revolutions per minute (rpm) to about 4500 rpm, for a period of time from about 2 minutes to about 30 minutes, in embodiments, from about 5 minutes to about 15 minutes, and at temperatures from about 20° C. to about 50° C., in embodiments, from about 22° C. to about 35° C.

Acidic Buffers

Suitable acids which may be utilized to form the buffer system include, but are not limited to, aliphatic acids and/or aromatic acids such as acetic acid, citric acid, formic acid, oxalic acid, phthalic acid, salicylic acid, combinations thereof, and the like. Suitable salts which may be utilized to form the buffer system include, but are not limited to, metallic salts of aliphatic acids or aromatic acids, such as sodium acetate, sodium acetate trihydrate, potassium acetate, zinc acetate, sodium hydrogen phosphate, potassium formate, sodium oxalate, sodium phthalate, potassium salicylate, combinations thereof, and the like.

In embodiments, a suitable buffer system may include a combination of acids and salts. For example, in embodiments, a buffer system may include sodium acetate and acetic acid.

In embodiments, a buffer system of the present disclosure may be in a solution with deionized water as the solvent.

The amount of acid and salts utilized in forming the buffer system, as well as deionized water utilized in forming a buffer solution, may vary depending upon the acid used, the salt used, and the composition of the toner particles. As noted above, in embodiments a buffer system may include both an acid and a salt. In such a case, the amount of acid in the buffer system may be from about 1% by weight to about 40% by weight of the buffer system, in embodiments from about 2% by weight to about 30% by weight of the buffer system. The amount of salt in the buffer system may be from about 10% by weight to about 50% by weight of the buffer system, in embodiments from about 30% by weight of the buffer system to about 40% by weight of the buffer system.

The amount of acid and/or salt in the buffer system may be in amounts so that the pH of the buffer system is from about 3 to about 7, in embodiments from about 4 to about 6. The buffer system may be added to the toner slurry as described above so that the pH of the toner slurry is from about 4 to about 7, in embodiments from about 5.8 to about 6.5.

As noted above, one of the last steps in the CSTR process of the present disclosure is coalescing toner particles. Coalescing may include stirring and heating as described above.

The pH of the mixture is then lowered with, for example, an acid or acidic buffer to coalesce the toner aggregates. Suitable acids include, for example, nitric acid, sulfuric acid, hydrochloric acid, citric acid or acetic acid. The amount of acid added may be from about 4 to about 30 percent by weight of the mixture, and in embodiments from about 5 to about 15 percent by weight of the mixture.

After coalescence, the mixture may be cooled to room temperature, such as from about 20° C. to about 25° C. The cooling may be rapid or slow, as desired. A suitable cooling method may include introducing cold water to a jacket around the reactor or a heat exchanger to quench. After cooling, the toner particles may be optionally washed with water, and then dried. Drying may be accomplished by any suitable method for drying including, for example, freeze-drying.

Coagulants

The emulsion aggregation process for making toners of the present disclosure uses at least a coagulant, such as a monovalent metal coagulant, a divalent metal coagulant, a polyion coagulant, or the like. A variety of coagulants are known in the art, as described above. As used herein, "polyion coagulant" refers to a coagulant that is a salt or oxide, such as a metal salt or metal oxide, formed from a metal species having a valence of at least 3, and desirably at least 4 or 5. Suitable coagulants thus include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, aluminum sulfate, and the like. Other suitable coagulants include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds in embodiments have from about 2 to about 13, such as from about 3 to about 8, aluminum ions present in the compound Such coagulants can be incorporated into the toner particles during particle aggregation. As such, the coagulant can be present in the toner particles, exclusive of external additives and on a dry weight basis, in amounts of from 0 to about 5 percent by weight of the toner particles, such as from about greater than 0 to about 3 percent by weight of the toner particles.

Uses

Toner particles produced utilizing the CSTR system in the present disclosure may have a size of about 1 micron to about 20 microns, in embodiments about 2 microns to about 15 microns, in embodiments about 3 microns to about 7 microns.

Toner in accordance with the present disclosure may be used in a variety of imaging devices including printers, copy machines, and the like. The toners generated in accordance with the present disclosure are excellent for imaging processes, especially xerographic processes and are capable of providing high quality colored images with excellent image resolution, acceptable signal-to-noise ratio, and image uniformity. Further, toners of the present disclosure may be selected for electrophotographic imaging and printing processes such as digital imaging systems and processes.

Developer compositions may be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the disclosures of each of which are hereby incorporated by reference in their entirety. The carriers may be present from about 2 percent by weight of the toner to about 8 percent by weight of the toner, in embodiments from about 4 percent by weight to about 6 percent by weight of the toner. The carrier particles may also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Imaging methods are also envisioned with the toners disclosed herein. Such methods include, for example, some of the above patents mentioned above and U.S. Pat. Nos. 4,265,990, 4,858,884, 4,584,253 and 4,563,408, the disclosures of each of which are hereby incorporated by reference in their entirety. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner may normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat.

Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer.

EXAMPLE 1

Seven round bottom flask reactors (e.g., from about 250 mL to about 500 mL in size), were equipped with overhead stirrers with half-moon impellers, and were connected in series to form a CSTR system, as shown in FIG. 1.

The first reactor 10 and the second reactor 20 performed an aggregation process. The third reactor 30 performed a shell addition process. The fourth reactor 40 performed a freeze process. The fifth reactor 50 performed a chelating process. The sixth reactor 60 performed a ramp-up process, whereas the seventh reactor 70 performed a coalescence process. Multi-channel peristaltic pumps 102 were used between each of the reactors 10-70 to channel the materials 14 and slurry through the train 100.

A shell latex 22 was pumped into the third reactor 30, continuously or periodically, a base (32), such as sodium hydroxide (NaOH), was pumped into the fourth reactor 40, continuously or periodically, a chelating agent (42), such as ethylene diamine tetraacetic acid (EDTA) (commercially available as VERSENE-100 from the Dow Chemical Company), was pumped into the fifth reactor 50, continuously or periodically, and a buffer (62), such as an acetate-acetic acid buffer, was pumped into the seventh reactor 70, continuously or periodically. As a result of this process, toner particles 80 were discharged from the seventh reactor 70, after about less than 1 hour.

Each of the reactors 10-70 was immersed in a temperature control bath to control the temperature of the toner slurry inside the reactors 10-70. Slurry within the reactors 10-70 was pumped into and out of the reactors 10-70 using multichannel peristaltic pumps. The shell latex 22 was pumped into the third reactor 30 using a peristaltic pump, whereas the base (32), the chelating agent (42), and buffer (62) were pumped into their respective reactors as necessary to achieve the various EA process steps.

In a beaker was mixed 823 grams amorphous core latexes, 140 grams crystalline core latex, 2259 grams deionized water (DIW), 3.2 grams surfactant (DOWFAX™ 2A1, an alkyldiphenyloxide disulfonate from the Dow Chemical Company), 208 grams SUN cyan pigment, and 179 grams of a polyethylene wax (from IGI). The toner slurry was then pH adjusted to 4.2 with 126 grams 0.3 M nitric acid ($HNO_3$). Then 141 grams aluminum sulfate solution (including of 10.6 grams aluminum sulfate and 131 grams DI water) was added drop-wise to the slurry mixture, while homogenizing at 3000-4000 rpm took place over a 10-15 minute period.

The first reactor 10 and the second reactor 20 (e.g., both being 250 mL flasks) were charged with 180 grams of the homogenized slurry. The third reactor 30 (e.g., being a 500 mL flask) was charged with 240 grams of homogenized slurry. The fourth reactor 40 and the fifth reactor 50 began in an empty state and filled once the continuous feed filled them. The sixth reactor 60 (e.g., being a 250 mL flask) was charged with 180 grams of DIW and the seventh reactor 70 (e.g., being a 500 mL flask) was charged with 240 grams of DIW. Additionally, reactors that were pre-filled with material, whether homogenized slurry or DIW were filled with flocculent-free slurry with or without pH adjustment. Both the sixth reactor 60 and the seventh reactor 70 were heated by external baths to achieve reactor temperatures of about 70° C. and about 85° C., with mixing at about 150 revolutions per minute (rpm) for both. The remaining homogenized slurry was continuously mixed at room temperature, with an overhead stirrer and a three-blade impeller at about 500 rpm. This slurry was used as the continuous feed slurry.

The first reactor 10, the second reactor 20, and the third reactor 30 were heated to a reactor temperature of, for example, about 32° C., 40° C., and 40° C., with mixing at about 290, 320 and 320 rpms, respectively. When stable particle sizes were achieved in each of these reactors 10, 20, and 30, the homogenized slurry was continuously pumped into the CSTR system 100 at about 40 grams/minute and the rpms in the first reactor 10 were increased to 350 rpm and in the second and third reactors 20, 30, the mixing speed was increased to 380 rpm. The approximate residence time per reactor was about 5 minutes. Shell latex was continuously pumped into the third reactor 20 at about 5.75 grams/minute.

Particle size traces obtained after the aggregation step (in the first and second reactors 10, 20) reached steady state after about 5 minutes and 10 minutes, respectively, as shown in FIG. 2(a) (210) and FIG. 2(b) (220). Particle size traces obtained after shell addition (in the third reactor 30) reached steady state after about 20 minutes, as shown in FIG. 2(c) (230).

Once the fourth reactor 40 had filled (about 5 minutes after slurry began pumping into CSTR system 100), base (32) was continuously pumped into the fourth reactor 40 at about 0.51 grams/minute, where the reactor temperature was about 41° C. and the pH was maintained from about 6 to about 7.

Once the fifth reactor 50 had filled (about 10 minutes after slurry began pumping into CSTR system 100), the chelating agent, EDTA (VERSENE-100) (42) was continuously pumped into the fifth reactor 50 at about 1.65 grams/minute, where the reactor temperature was about 47° C. and the pH was maintained at from about 7 to about 8.3. As shown in FIG. 2(d) (240) and FIG. 2(e) (250), the particles were frozen in about 10 minutes (the residence time in fourth and fifth reactors 40, 50 was about 10 minutes).

The process proceeded to the sixth reactor 60, where the slurry in the reactor 60 underwent an instant temperature ramp because the reactor temperature was maintained at about 70° C. The particle size distribution from the sixth reactor 60 is shown in FIG. 2(f) (260).

Once the seventh reactor 70 had filled (about 25 minutes after slurry began pumping into CSTR system 100), 3M sodium acetate-acetic acid buffer (62) was continuously pumped into the seventh reactor 70 at about 0.65 grams/minute. In the seventh reactor 70, the particles were coalesced at a reactor temperature of about 85° C., and maintained a pH of less than about 7 with the addition of the 3M sodium acetate-acetic acid buffer (62).

Toner product obtained from the seventh reactor 70 was quenched by stirring the product in a beaker filled with DIW ice cubes. After approximately 45 minutes (Note: residence time in the complete CSTR system 100 was approximately 45 minutes), particle size distribution obtained at the end of the CSTR system 100 reached steady state, as shown in FIG. 2(g) (270). This represented time zero for the process. This was the time at which the process had transitioned to its continuous steady state performance. As shown in FIG. 2(g) (270) and FIG. 2(h) (280), the steady state particle size distribution and circularity after the complete EA process was comparable to that achieved in a batch process.

Toner particle size distributions were monitored in all seven reactors 10-70. Particle size distributions reached steady state in reactors 10-70 in about 5 minutes, 10 minutes, 20 minutes, 25 minutes, 30 minutes, 35 minutes, and 45 minutes, respectively, after slurry began pumping into the CSTR system 100. Steady state particle size distributions obtained at the end of the process (at about 90 minutes after slurry began pumping into the CSTR system 100) are shown in FIGS. 2A-2G (200-280). The pH of slurry was monitored in the fourth, fifth, sixth, and seventh reactors (40-70). Reactors 40-70 maintained a pH level of about 6 to about 7, about 7 to about 8.3, about 7 to about 8.3, and less than 7, respectively. Thus, with this process, toner slurry was continuously generated at about 40 mL/minute.

EXAMPLE 2

Five round bottom flask reactors (from about 250 mL to about 500 mL in size), each equipped with overhead stirrers with half-moon impellers, were connected in series to form a CSTR system 300.

The first reactor 310 performed an aggregation process. The second reactor 320 performed a shell addition process. The third reactor 330 performed a freeze process and a chelating process. The fourth reactor 340 performed a ramp-up process, whereas the fifth reactor 350 performed a coalescence process. A multi-channel peristaltic pump 302 was used between each of the reactors 310-350 to pump the materials 316 and slurry through the train 300.

A shell latex 312 was pumped into the second reactor 320, continuously or periodically, a caustic buffer such as Tris-HCl and a chelating agent such as EDTA (VERSENE-100) (322), were pumped into the third reactor 330, continuously or periodically, and an acidic buffer, such as an acetate-acetic acid buffer (342), was pumped into the fifth reactor 350, continuously or periodically. As a result of this process, toner particles 360 were discharged from the fifth reactor 350, after about less than 1 hour.

Each reactor 310-350 was heated either through external fluid jackets Slurry within the reactors 310-350 was pumped into and out of the reactors 310-350 using multi-channel peristaltic pumps 302. The shell latex 312 was pumped into the second reactor 320 using a peristaltic pump, whereas the 1M tris(hydroxymethyl)aminomethane-hydrochloric acid buffer, (322) chelating agent EDTA (VERSENE-100) (322), and 3M sodium acetate-acetic acid buffer (342), were pumped into their respective reactors using positive displacement pumps as necessary to achieve the various EA process steps.

The process began by the homogenization 314 of a slurry according to the same formulation and process as in the first example described above. The first reactor 310 (e.g., being a 250 mL flask) was charged with 180 grams of homogenized slurry. The second reactor 320 (e.g., being a 500 mL flask) was charged with 240 grams of homogenized slurry. The third reactor 330 (e.g., being a 250 mL flask) began to empty and filled once the continuous feed filled it. The fourth reactor 340 (e.g., being a 250 mL flask) was charged with 180 grams of DIW and the fifth reactor 350 was charged with 240 grams of DIW.

The first and second reactors 310, 320 were both heated to reactor temperatures of about 43° C. and mixed at about 320 rpm. The second reactor 320 was continuously pumped with shell latex 312 at about 5.75 grams/minute. When stable particle sizes were achieved in the first and second reactors 310, 320, the homogenized slurry in at least one reactor was continuously pumped into the CSTR system 300 at about 40 grams/minute. The approximate residence time per reactor was about 5 minutes and/or 10 minutes. Particle size distributions obtained after the aggregation step (in the first reactor 310), reached steady state after about 5 minutes, as shown in FIG. 4(*a*) (410). Particle size distributions obtained after shell addition (in the second reactor 320), reached steady state after about 15 minutes, as shown in FIG. 4(*b*) (420).

Following the shell addition step, the particle aggregation was followed by a freeze and chelation step in the third reactor 330. The third reactor 330 was heated to a reactor temperature of about 46° C. and mixed at about 150 rpm. Once the third reactor 330 was filled (about 5 minutes after slurry began pumping into the CSTR system 300), both 1M tris(hydroxymethyl)aminomethane-hydrochloric acid buffer (322) and EDTA (VERSENE-100) (322) were continuously pumped into the third reactor 330 from about 0.40 grams/minute to about 1.65 grams/minute, respectively, and maintained a pH at from about 7 to about 8.3. As may be seen in FIG. 4(*c*) (430), the particles were frozen in about 5 minutes (the residence time in the third reactor 330 was about 5 minutes).

The process then proceeded to the fourth reactor 340, where the slurry was instantly heated by external baths, and mixed at about 150 rpm. FIG. 4(*d*) (440) shows the steady state particle size distribution obtained from the fourth reactor 340.

Once the fifth reactor 350 was filled (about 20 minutes after slurry began pumping), 3M sodium acetate-acetic acid buffer (342) was continuously pumped into the fifth reactor 350 at about 0.45 grams/minute. In the fifth reactor 350, the particles were coalesced at a reactor temperature of about 85° C., and maintained a pH of less than about 6 with the addition of the 3M sodium acetate-acetic acid buffer (342). Toner product was obtained from the exit pumping line in the fifth reactor 350 and was quenched by stirring the product in a beaker filled with DIW ice cubes.

As a result, after about 35 minutes (the residence time in the complete CSTR system 300 was about 35 minutes), particle size traces obtained at the end of the CSTR system 300 reached steady state, as shown in FIG. 4(*e*) (450). Similar to the first example described above, this represented the time at which the process had transitioned to its continuous steady state performance.

As shown in FIG. 4(*e*) (450) and FIG. 4(*f*) (460), the steady state particle size distribution and circularity after the complete EA process was comparable to that achieved in a batch process. Thus, once again, coalesced toner particles were generated with this continuous process at about 40 mL/minute, which required about 35 minutes.

Toner particle size distributions were monitored in each reactor 310-350. Particle size distributions achieved steady state in reactors 310-350 in about 5 minutes, 15 minutes, 20 minutes, 25 minutes, and 35 minutes after slurry began pumping into the CSTR system 300. Steady state particle size distributions obtained at the end of the process (at about 90 minutes after slurry began pumping into the CSTR system 300) are shown in FIGS. 4A-4E (410-460). The mixing speeds in the first and second reactors 310, 320 were not increased after slurry began pumping into the CSTR system 300, but do not show significant adverse impact on the incorporation of feed slurry into the toner particles 360, as shown in FIGS. 4A-4E (410-460).

Slurry pH was monitored in the third, fourth, and fifth reactors 330-350. The pH levels in reactors 330-350 were about 7 to about 8.3, about 7 to about 8.3, and less than about 6, respectively. Circularity of the toner product was monitored, as shown in FIG. 4(*e*) (450). Circularity of greater than 0.960 was maintained after time zero. At about 90 minutes after slurry began pumping into the CSTR system 300, the process was stopped due to the complete consumption of the feed slurry, shell latex 312, and EDTA (VERSENE-100) (322).

Thus, in the second example, the aggregation step was achieved in one reactor in about 5 minutes (the residence time in the first reactor 310 was about 5 minutes) and the freeze and chelation steps were combined into one reactor without negatively influencing the particle size distribution. The second example demonstrated that the continuous setup may be simplified from a 7-CSTR system 100 (see FIG. 1) to a 5-CSTR system 300 (see FIG. 3).

Further, although aspects of the present disclosure have been described herein in the context of several particular implementations in particular environments for particular purposes, those of ordinary skill in the art will recognize that its usefulness is not limited thereto and that the present disclosure may be beneficially implemented in any number of environments for any number of purposes.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A continuous stirred tank reactor system for the production of toner particles by emulsion aggregation, comprising: at least one feed tank of raw materials; at least one reactor comprising an aggregating resin; optionally at least one reactor comprising a shell material; at least one reactor, wherein particle aggregation is frozen therein; optionally at least one reactor comprising a chelating agent; at least one reactor, wherein content temperature therein is increased; and at least one reactor, wherein particles are coalesced therein; wherein the reactors are sequentially assembled in a series configuration, each of the reactors operating with a mechanical agitator, and wherein toner particles are produced by said reactors in series with a space time yield of from about 10 g particles/L/hr to about 500 g particles/L/hr.

2. The continuous stirred tank reactor system as in claim 1, wherein each of the reactors is temperature controlled by externally applied cooling or heating.

3. The continuous stirred tank reactor system as in claim 1, wherein material flows from one reactor to the next via a conduit.

4. The continuous stirred tank reactor system as in claim 1, wherein fluid is pumped continuously from one reactor to the next.

5. The continuous stirred tank reactor system as in claim 1, wherein a shell latex is continuously or periodically pumped into the process; wherein a base or a basic buffer is continuously or periodically pumped into the process; wherein a chelating agent is continuously or periodically pumped into the process; and wherein a buffer is continuously or periodically pumped into the process.

6. The continuous stirred tank reactor system as in claim 1, wherein the materials are mixed at independent rates for each reactor to control particle size and particle size distribution.

7. The continuous stirred tank reactor system as in claim 1, wherein reactor temperatures are incrementally higher in the direction of material flow.

8. The continuous stirred tank reactor system as in claim 1, wherein a residence time of each reactor is from about 0.5 minutes to about 60 minutes.

9. The continuous stirred tank reactor system as in claim 1, wherein pH is controlled in each reactor by altering the feed rate of basic or acidic solutions to each reactor.

10. The continuous stirred tank reactor system as in claim 1, wherein the agitator rpm and impeller are selected for each reactor to provide a narrow particle size distribution.

11. The continuous stirred tank reactor system as in claim 1, wherein core latexes, pigment, wax, and aluminum sulfate are fed in continuously at a temperature of 1° C. to 15° C. into a first continuous stirred tank reactor that then flows into the continuous stirred tank reactor system.

12. A continuous emulsion aggregation method for producing toner particles comprising: providing a plurality of reactors sequentially assembled in a series configuration; introducing raw materials for the toner particles into a continuous stirred tank reactor system; facilitating an aggregation process via a first reactor and a second reactor; optionally facilitating a shell material addition process via a third reactor; facilitating a freeze process via a fourth reactor; facilitating a chelating process via a fifth reactor; facilitating a temperature ramp-up process via a sixth reactor; and facilitating a coalescence process via a seventh reactor, wherein particles are produced by said series of reactors with a space time yield of from about 10 g particles/L/hr to about 500 g particles/L/hr.

13. The method as in claim 12, wherein each of the reactors is temperature controlled by externally applied cooling or heating.

14. The method as in claim 12, wherein material flows from one reactor to the next via a conduit.

15. The method as in claim 12, fluid is pumped continuously from one reactor to the next.

16. The method as in claim 12, wherein a shell latex is continuously or periodically pumped into the third reactor wherein a base is continuously or periodically pumped into the fourth reactor; wherein a chelating agent is continuously or periodically pumped into the fifth reactor; and wherein a buffer is continuously or periodically pumped into one of the reactors.

17. The method as in claim 12, wherein the materials are mixed at independent rates for each reactor to control panicle size and particle size distribution.

18. The method as in claim 12, wherein reactor temperatures are incrementally higher in the direction of material flow; wherein a residence time of materials in each reactor is from about 0.5 minutes to about 60 minutes; and wherein pH is controlled in each reactor by altering the feed rate of caustic or acidic solutions to each reactor.

* * * * *